United States Patent Office 2,967,588
Patented Jan. 10, 1961

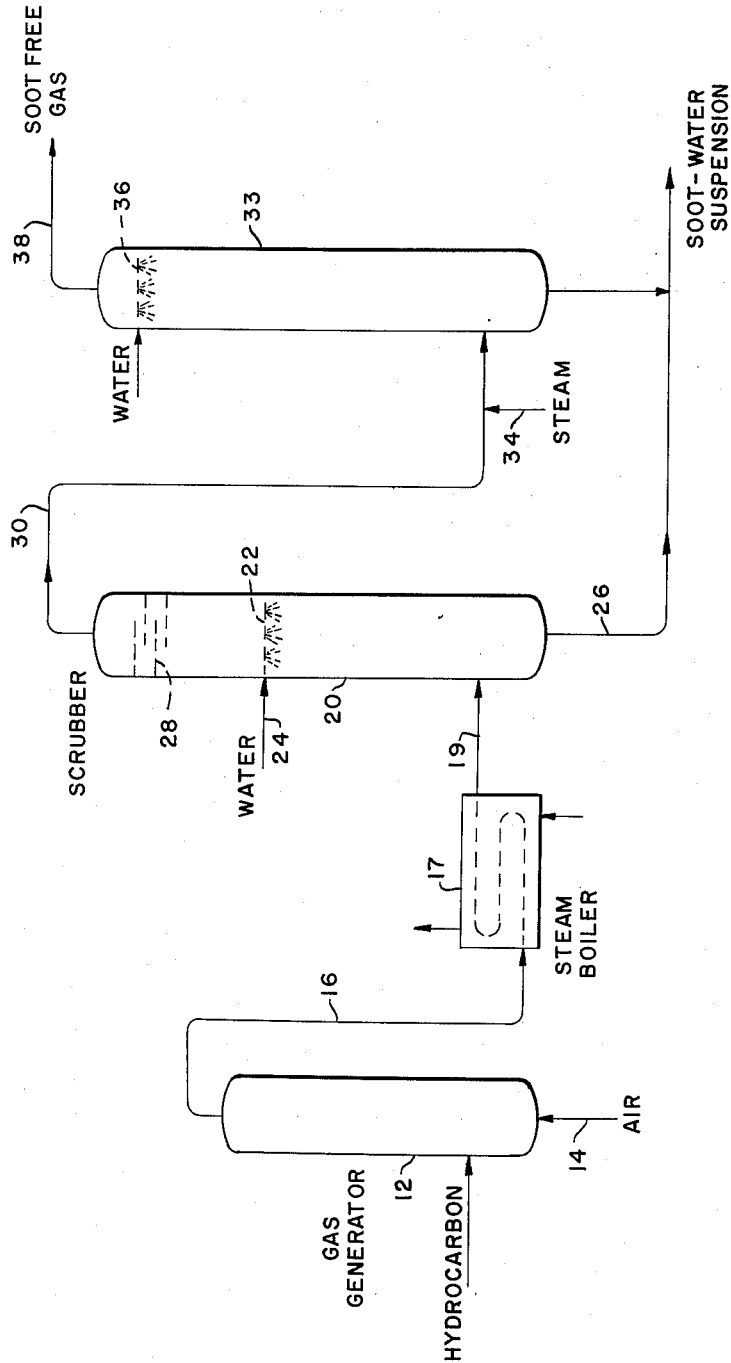

2,967,588
SOOT RECOVERY

Karel Swart, The Hague, Netherlands, assignor to Shell Oil Company, a corporation of Delaware Filed Aug. 18, 1958, Ser. No. 755,673

Claims priority, application Netherlands Dec. 31, 1957

4 Claims. (Cl. 183—120)

This invention relates to an improved method for recovering soot from a gaseous stream. The process may be employed, for example, to remove soot from a synthesis gas produced by a gas generator or for the recovery of soot particles in the manufacture of carbon black.

The gases from a synthesis gas generator normally have very high temperatures, upwardly of 1000° C. and historically, these hot gases have been sprayed with large quantities of water for a two-fold purpose, namely, to effect a cooling to room temperature and simultaneously to scrub the gases free of carbon. Because of the large quantities of water used, the carbon has been separated from the gases in an objectionably dilute, aqueous soot suspension. Soot is separated from the scrub water by holding the soot in water suspensions for long periods of time in large sedimentation tanks. It is now known that the amount of water required to bring about cooling of the furnace gases to ambient room temperature is unnecessarily large for the purpose of soot removal. With the practice of the process of the instant invention, it is possible to recover soot with much less water and greater effectiveness. The use of less water for soot removal facilitates the separation of the soot from the scrub water.

In the partial combustion of gaseous hydrocarbons, e.g. natural gas, to produce synthesis gas, in which only a very small proportion of carbon black is produced, the removal of the carbon black is much more difficult than when the hydrocarbon combusted is liquid. It appears that the lower the content of free carbon in the gas stream, the less effective is the conventional carbon black removal system employing water washing.

It is an object of this invention to provide an improved method for soot removal requiring less wash water. A still further object is to provide a process which permits a more complete removal of carbon from a gaseous stream having a very low carbon content. These and other objects of the invention will become more apparent from the following description of the invention when taken in conjunction with the sole figure of the drawing which is a diagrammatic sketch of a preferred embodiment of one system for the practice of the process of the invention.

It has now been found that it is possible to remove soot more efficiently and with less water if the scrubbing of the hot gaseous stream is discontinued upon the saturation of the gases or preferably shortly thereafter. The water scrubbed gaseous stream is then passed through a de-entrainment zone wherein substantially all of the liquid water carried by it is removed. Saturated steam is then introduced into the water droplet-free gas stream and the stream subsequently cooled. During the course of the cooling, the remainder of the soot is removed.

The favorable results of the present process may possibly be explained by assuming that the removal of soot is primarily attributable to the soot particles acting as condensation nuclei for water vapor, so that in time each particle becomes surrounded by a film of water. With the continued cooling and condensation of the water vapor, the film of water encompassing the soot particle grows to such an extent that it can be readily removed from the gaseous stream. However, it is believed that after the gaseous stream becomes saturated with water vapor the advantage to be had in further injection of finely dispersed water is slight, with the result large quantities of water are required to complete the removal of soot. It is thought that with the further injection of the scrubbing water beyond the dew point, the water vapor preferentially condenses on the droplets of liquid water which are cold compared to the soot particles, with the result that the particles on which no water initially condenses when the dew point is reached can generally only be removed with the use of excessively large quantities of water. It is for this reason that it is essential to the process of the invention that there be a substantially complete removal of all the liquid water droplets entrained in the gaseous stream upon the completion of the initial scrubbing operation. With the removal of the water droplets before the injection of the saturated steam, the later injected stream has an opportunity to condense uniformly on all of the soot particles. As a result of this initial uniform condensation on the soot particles, it is possible to subject the gaseous stream to a second water scrubbing without fear that the water vapor will preferentially precipitate upon the water droplets making up the spray, necessitating as formerly the use of very large quantities of water to effect the removal of soot. This initial condensation of the water vapor more uniformly on all of the soot particles permits the removal of soot with much less water than formerly required.

In an alternative embodiment, the gaseous stream following the steam injection is indirectly cooled without the use of a second water spraying. Here, since there is a uniformly initiated condensation of water vapor on the soot particles, further cooling of the gaseous stream results in a gradual build-up of the many films of water surrounding the individual soot particles until a point is reached where adjacent soot particles coalesce and separate from the gaseous stream. In the single example following, indirect cooling is used to remove the last of the soot particles from the gas.

The process of the invention is best performed at an elevated pressure of at least 5 atmospheres absolute and preferably in the range of 10–30 atmospheres absolute. The dew point or water vapor saturation temperature of a gaseous mixture is proportional to the magnitude of pressure, that is to say, smaller amounts of water are needed to saturate high pressure gases than are required for the saturation of gases under less pressure. Therefore, it becomes advantageous in the practice of the process of this invention to spray furnace gases having relatively elevated pressures for the reason smaller amounts of water are then sufficient for the removal of the soot.

Conveniently, the de-entrainment zone (preceding the steam injection) may be a series of baffles placed in the path of the water-scrubbed gas stream. In an alternative, the scrubbed stream may be passed through a cyclone separator. The water scrubbing is preferably discontinued before the actual temperature of the stream drops below about 5° C. of the temperature at the time of the initial saturation.

In the preferred embodiment of this process, the generator gases are first cooled (before the initial water spraying) by indirect heat exchange to a temperature within the range of approximately 150–500° C. and preferably to a temperature in the range of 200–350° C. This cooling is best accomplished by passing the combustion gases through a steam boiler. By lowering the temperature of the hot gases before spraying, still less water is required for scrubbing the gases free of carbon.

The process of the invention may be used to treat gases from any process in which incomplete combustion of hydrocarbon is had, resulting in the production of free carbon or soot and this includes gaseous streams in carbon black manufacture and synthesis gases. A very suitable gas mixture for treatment in accordance with the instant process is that produced by the combustion device described in the Te Nuyl et al. patent, U.S. 2,806,517.

The amount of saturated steam needed to initiate the uniform condensation of vapor on the soot particles varies considerably, depending on various factors, such as soot content and the pressure of the operation. In the example following, 80 kg. of saturated steam per 1000 kg. of the gaseous stream (dry basis) was adequate. Generally speaking, steam in the amount of 10 to 200 kg. per 1000 kg. of dry gas will suffice for the soot contents normally encountered.

With reference to the drawing, a suitable hydrocarbon is introduced through a line 10 to the combustion chamber of a gas generator 12. The hydrocarbon is intimately mixed and combusted in the generator with a gaseous oxidant, such as air or oxygen supplied through a line 14. It may be desirable to supply steam and in that event the steam may be added through the oxygen line. The combustion gases having a temperature of say approximately 1300° C. pass through a conduit 16 into a heat exchanger 17 which may be a steam boiler. Here the hot gases are cooled to a temperature of, for example, 250° C. The cooled gases leave the steam boiler and flow through a conduit 19 into the lower section of a scrub tower 20. The gases pass upwardly through the tower into contact with a downwardly directed water spray furnished by a set of nozzles 22. The water to the nozzle set is supplied by a line 24. The larger proportion of the soot is scrubbed from the rising synthesis gas and is removed in a water soot suspension from the base of the scrubber through a line 26. The gaseous stream beyond the spray nozzle in the upper portion of the tower encounters several baffles 28 which substantially remove the last of the liquid water droplets, leaving a water vapour saturated gaseous stream. The scrubbed gaseous stream leaves the top of the tower via a line 30 which opens into a second scrubber 33. Along the length of this line 30 there is provision for introducing saturated steam via a line 34 into the gaseous stream flowing therein.

The steam-laden gaseous stream enters the second scrubber near its bottom and passes upwardly into contact with a descending water spray furnished by a second set of nozzles 36. This second water spray further cools the gas mixture, promoting condensation of water vapour into the film of water surrounding the particles to such an extent that the soot particles are readily removed by the scrubbing water. If desired, part of the soot-water suspension obtained may be recycled to the first and/or to the second scrubber. In an alternative embodiment, the second scrubber is replaced by an indirect heat exchanger and there the steam-laden synthesis gas is cooled without the direct addition of water and there on cooling the water vapour condenses upon the soot particles, eventually adding sufficient moisture to the individual films surrounding the particles as to cause their coalescence and precipitation from the gaseous stream.

*Example*

This example illustrates the application of the process of the invention to the removal of soot from a gas mixture made up of hydrogen and carbon monoxide obtained by the partial combustion of a hydrocarbon oil with pure oxygen.

The hot gas from the gas generator at a pressure of 28 kg./sq. cm. and approximately 1300° C. is initially cooled by indirect heat exchange to a temperature of 250° C. The gaseous stream contains 130 kg. of water vapor per 1000 kg. of dry gas, together with approximately 6 kg. of soot.

The gas from the heat exchanger is scrubbed with water at 30° C. in a vertical scrubbing column with 320 kg. of water being used per 1000 kg. of dry gas. There is an evaporation of 32 kg. of the water into the gaseous stream, with 288 kg. water being removed in the form of a water-soot suspension from the bottom of the scrubber. There is 5,970 grams of soot contained in the water-soot suspension. The gaseous stream out of the water scrubber is at a temperature of approximately 140° C.

Saturated steam at a temperature of 235° C. (corresponding to a pressure of 31 kg./sq. cm.) is introduced to the water scrubbed gas in an amount of 80 kg. of steam per 1000 kg. of the dry gas. The gas following water scrubbing and prior to steam injection is passed through a deentraining zone to remove substantially completely all water droplets therefrom.

Subsequent to the introduction of the steam, the gas is cooled by indirect heat exchange to 20° C. As a result of the cooling, 241 kg. of water condenses along with 29 grams of soot (basis of 1000 kg. of dry gas). The product gas contained approximately 1 gram of soot per 1000 kg. dry gas.

I claim as my invention:

1. In a process employing a water spray in the removal of soot from a hot gaseous stream, the improvement comprising spraying the gaseous stream with finely dispersed water to cool and to saturate said stream and thereby removing a large proportion of the soot in a water-soot suspension, discontinuing the spraying and passing the saturated gaseous stream through a de-entraining zone wherein substantially all of its entrained water droplets are removed, introducing saturated steam into the water-saturated gaseous stream, and subsequently further cooling the gaseous stream and during the course of said cooling substantially completing the removal of the soot therefrom.

2. A process in accordance with claim 1 wherein the subsequent cooling is achieved by a second water spraying.

3. A process in accordance with claim 1 wherein the soot-containing gaseous stream is indirectly cooled prior to being sprayed with water.

4. A process in accordance with claim 1 wherein the gaseous stream is at a pressure in excess of about 5 atmospheres absolute and wherein the spraying is discontinued before the actual temperature of said stream drops below about 5° C. of the temperature at the time of the initial saturation.

References Cited in the file of this patent

UNITED STATES PATENTS

| | | |
|---|---|---|
| 991,157 | Kestner | May 2, 1911 |
| 2,585,659 | Kilpatrick | Feb. 12, 1952 |
| 2,668,754 | Lichtenfels | Feb. 9, 1954 |

FOREIGN PATENTS

| | | |
|---|---|---|
| 354,106 | France | of 1905 |